US008965324B2

(12) United States Patent
Albanes et al.

(10) Patent No.: US 8,965,324 B2
(45) Date of Patent: Feb. 24, 2015

(54) E911 SERVICES USING DISTRIBUTED NODES

(75) Inventors: Stalin Fernando Albanes, Dunwoody, GA (US); Ming-Ju Ho, Alpharetta, GA (US); Allenn Han, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1014 days.

(21) Appl. No.: 12/606,560

(22) Filed: Oct. 27, 2009

(65) Prior Publication Data

US 2011/0009085 A1    Jan. 13, 2011

Related U.S. Application Data

(60) Provisional application No. 61/224,027, filed on Jul. 8, 2009.

(51) Int. Cl.
  *H04M 11/04* (2006.01)
  *H04W 4/02* (2009.01)
  *H04W 76/00* (2009.01)
  *H04W 4/22* (2009.01)

(52) U.S. Cl.
  CPC .............. *H04W 4/02* (2013.01); *H04W 76/007* (2013.01); *H04W 4/22* (2013.01)
  USPC .................................... 455/404.1; 455/456.1

(58) Field of Classification Search
  USPC .......... 455/404.1, 404.2, 456.1, 456.2, 456.3, 455/456.5, 457, 444
  See application file for complete search history.

(56) References Cited

U.S. PATENT DOCUMENTS

| | | | |
|---|---|---|---|
| 8,126,423 B2 * | 2/2012 | Dunn et al. ................ | 455/404.1 |
| 8,718,596 B1 * | 5/2014 | Xue et al. ................... | 455/404.2 |
| 2004/0203876 A1 * | 10/2004 | Drawert et al. ............ | 455/456.1 |
| 2005/0153687 A1 * | 7/2005 | Niemenmaa et al. ...... | 455/414.2 |
| 2007/0149243 A1 * | 6/2007 | Hwang et al. ................ | 455/551 |
| 2008/0026722 A1 * | 1/2008 | Dunn et al. ................ | 455/404.1 |
| 2008/0108319 A1 * | 5/2008 | Gallagher .................. | 455/404.2 |
| 2009/0177730 A1 * | 7/2009 | Annamalai et al. .......... | 709/202 |
| 2009/0264095 A1 * | 10/2009 | Khetawat et al. .......... | 455/404.2 |
| 2009/0311987 A1 * | 12/2009 | Edge et al. ................. | 455/404.1 |
| 2010/0029243 A1 * | 2/2010 | Ozer et al. ................. | 455/404.1 |
| 2010/0136947 A1 * | 6/2010 | Yoo et al. .................. | 455/404.2 |

* cited by examiner

*Primary Examiner* — Khawar Iqbal
(74) *Attorney, Agent, or Firm* — Baker & Hostetler LLP (57) ABSTRACT

Distributed node systems and methods provide emergency call services to users indoors. A distributed node can be located in a building and configured to receive call requests from users in the building. The distributed node can transmit call requests to a central node that relays the call requests to a wireless network. The distributed node can also transmit node identifying information with the call request, which may be relayed to the wireless network. The wireless network can determine that a call request is a request for an emergency call and obtain location information and emergency services provider routing information based on a node identifier. The wireless network can transmit the location information to the emergency services provider using the emergency services provider routing information and set up the requested call.

13 Claims, 7 Drawing Sheets

E911 SERVICES USING DISTRIBUTED NODES

CROSS REFERENCE TO RELATED APPLICATIONS

The present application claims priority to U.S. Provisional Patent Application No. 61/224,027 entitled "Location Determination For Calls Within A Femto Cell" filed Jul. 8, 2009, which is hereby incorporated by reference in its entirety.

TECHNICAL FIELD

The technical field generally relates to wireless communications and more specifically relates to providing enhanced 911 service to indoor locations.

BACKGROUND

Communications devices such as cellular telephones, mobile communication devices, personal digital assistants (PDAs), laptops, and the like are becoming more prevalent as technology advances and makes these devices more powerful and more affordable. Location-based services have been developed for these devices based on the premise that service providers are able to identify the location of mobile devices attached to their networks and provide additional services based on that location. More specifically, it is a requirement of the Federal Communications Commission (FCC) that emergency 911 (E911) calls made from mobile devices must provide caller location accuracy within 50 meters for 67% of the calls and within 100 meters for 100% of the calls for handset based location determination. It is further required that E911 calls made from mobile devices must provide caller location accuracy within 100 meters for 67% of the calls and within 300 meters for 100% of the calls for network based location determination. Most devices in use by typical users do not have direct global positioning system (GPS) capabilities. Some may use assisted GPS, where the network assists a properly configured device with locating and communicating with GPS satellites in order to obtain location information. Other devices may have no location capabilities on-board, and the networks supporting such devices may determine the device location using various methods known to those skilled in the art, including trilateration.

Many of the technologies used to provide or determine location information are less effective or not available indoors. This may be due to the inability to communicate with GPS satellites. In other situations, a newer technology, such as $3^{rd}$ generation (3G) wireless technology, may not be fully capable of providing location technology indoors and an older technology, such as $2^{nd}$ generation (2G) wireless technology may be used to determine or acquire the location of a device. However, this may involve installing and/or maintaining redundant network equipment, for example installing and maintaining both 2G and 3G equipment, resulting in great cost to a carrier or network provider in order to comply with FCC requirements. Also, the coverage areas of an older technology network may not exactly overlap the coverage area of the newer technology network, leaving gaps in emergency coverage which may result in a failure to meet FCC requirements, and, more importantly, delayed or failed response to emergency calls.

SUMMARY

Methods and systems are disclosed for providing a distributed node system that facilitates providing emergency call services to users located indoors. A distributed node may be located in a building and configured to receive call requests from users in the building. Location information for the distributed node may be recorded by a wireless network operator or a third party upon or before the activation of the distributed node. The distributed node may transmit received call requests to a central node that relays the call requests to a wireless network. Along with the call request, the distributed node may also transmit node the distributed node identification information, such as a node identifier, with the call request. Alternatively, the distributed node may alter the call request to include a node identifier.

The central node may transmit a received call request and node identifier to a wireless network. The wireless network may determine that the call request is a request for an emergency call and obtain location information and emergency services provider routing information based on the node identifier. The wireless network may obtain location information and emergency services provider routing information by transmitting the node identifier to a location services device and receiving the requested information from the location services device. The wireless network may transmit the location information received from the location service device to the emergency services provider using the emergency services provider routing information. The wireless network may also set up the requested call between the requesting device and the emergency services provider.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
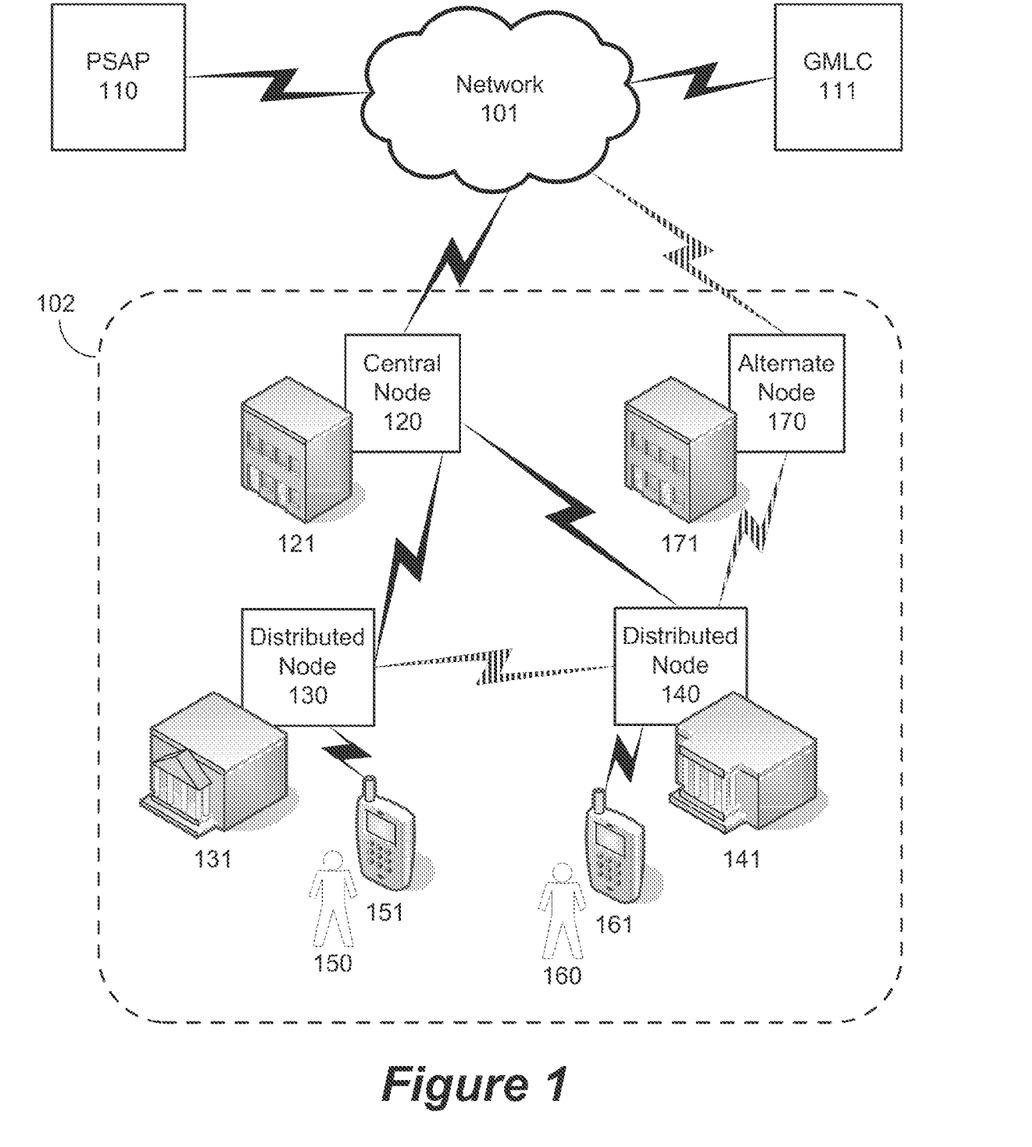
FIG. 1 is a graphical representation of an exemplary, non-limiting network in which E911 services using distributed nodes may be implemented.

FIG. 1 illustrates an exemplary, non-limiting network and system that may be used to implement E911 and/or other emergency call services using distributed nodes. Network 101 may be any type of network capable of providing wireless services to wireless devices of any type. Network 101 represents any number of interconnected networks that may be composed of any number and type of wired and/or wireless network devices. Network 101 may provide wireless service to device within the area of campus 102. Campus 102 may be any area where one or more buildings are arranged proximate to one another in physical space. Alternatively, or additionally, one or more of the buildings within campus 102 may be geographically distant from one or more other buildings in campus 102, but may be communicatively connected through various means, including wireless and wired communication means.

The operator of network 101 may wish to provide wireless service to campus 102 without providing the full scale base stations that may be required to provide every portion of campus 102 with direct access to network 101. For example, the operator of network 101 may wish to provide 3G network services across campus 102, but may find that implementing base stations that communicate directly with network 101 using the preferred technology every place where connectivity to network 101 is desired (including inside buildings 121, 131, and 141) is cost prohibitive. Therefore, in one embodiment, the operator of network 101 may install a distributed node environment on campus 102.

In such a configuration, a central node may be installed in a central location. For example, central node 120 may be installed in building 121. Central node 120 may communicate directly with network 101, and may also communicate with distributed nodes located throughout campus 102. Central node 120 may be a fully functional and fully featured wireless network base station that directly receives wireless communications data from wireless devices and facilitates communication between wireless devices and network 101. Central node 120 may also relay information, including data, voice, and any other form of wired or wireless communication, between distributed nodes 130 and 140 and network 101. Alternatively, central node 120 may be dedicated to serving only as a central node or hub that relays data, such a voice call data, between network 101 and distributed nodes 130 and 140. In such an embodiment, central node 120 may not directly receive wireless or wired communications from end user devices. Distributed nodes 130 and 140 may be located respectively in buildings 131 and 141. Distributed nodes 130 and 140 may not be capable of communicating directly with network 101, but may instead be configured to communicate directly with central node 120, and may not have all the features and functions of a full wireless network base station. This may allow distributed nodes 130 and 140 to be less expensive to manufacture and/or purchase because less equipment is needed, and such nodes may also be less expensive to install and operate. Distributed nodes 130 and 140 may communicate with central node 120 using any effective means, including wired and wireless means. Note that each of nodes 120, 130, and 140 may any type and any number of network devices configured to allow communications between devices of any type. In one example, any or all of nodes 120, 130, and 140 may be distributed node-B wireless base stations.

Nodes such as central node 120 and distributed nodes 130 and 140 may be located in an area of a building where emergency personnel are likely to go. For example, such nodes may be located in the lobbies of buildings. These nodes may also include other elements that are distributed throughout a building in order to improve performance. For example, repeaters, splitters, antennas, and/or similar devices may be installed throughout a building so that adequate wireless coverage can be provided throughout the building.

Gateway Mobile Location Center (GMLC) 111 may be communicatively connected to and provide location services for network 101. When a location of a wireless device is needed by network 101, for example when an emergency call such as a 911 call is received on network 101, network 101 may request location information for the calling device from GMLC 111. Such location information may be for the node that received the emergency call rather than for the calling device itself GMLC 111 may determine location information by accessing a database and determining location information from related data, such as a cell identifier. In some embodiments, the cell identifier may be a Cell Global Identity (CGI). A CGI may be a concatenation or combination of a Location Area Identity (LAI) and a Cell Identity (CI) that uniquely identifies a particular cell. The operator of network 101 may provide location information and cell identifiers for each of nodes 120, 130, and 140 to GMLC 111, which may statically store such information, for example, in a database. This information may include longitude and latitude, an address, and/or any other physical location information. This information may be configured on GMLC 111 as each node is constructed or configured, or may be set following construction or configuration of the nodes, either before or after the nodes become active. Cell identifiers and/or location information may be stored on GMLC 111 or may be stored on a separate device or system that is accessible by GMLC 111. Any other configuration of devices or systems that allow a GMLC access to location information for nodes and/or cells is contemplated as within the scope of the present disclosure.

For each location record stored or accessible by GMLC 111, GMLC 111 may also store or otherwise have access to public safety answering point (PSAP) data, such as routing data. This information may be used by network 101 to direct an incoming call to the correct destination. For example, if an emergency call is received on network 101, and network 101 transmits a location query to GMLC 111, GMLC 111 may respond with the location information for the base station that initially received the emergency call and the destination phone number or other destination data for the 911 call center nearest to or assigned to the base station. This allows network 101 to direct the call to the appropriate emergency services center or PSAP based on the location of the base station. In one embodiment, the appropriate emergency services center or PSAP may be the emergency services center or PSAP nearest to or otherwise assigned to the base station.

When nodes 120, 130, and 140 are installed, configured, activated, or otherwise prepared for use, the operator of network 101 may provide location information for each such nodes to GMLC 111. This location information may be phase two location information as known by those skilled in the art, which includes longitude and latitude, and/or an address of the building in which each node is installed. Such location information may be used to facilitate emergency calls initiated by users in buildings on campus 102. For example, if user 150 is operating wireless device 151 inside building 131 and initiates a call to 911, the call request may be received at distributed node 130. Distributed node 130 may transmit the call request to central node 120 located in building 121. In transmitting the call request, distributed node 130 may include a cell identifier that uniquely identifies distributed node 130. Central node 120 may relay the call request including the cell identifier to network 101.

Upon receiving the call request, network 101 may evaluate the call request and determine that this is a request for an emergency call, and therefore network 101 will require location information to properly process the request. Network 101 may then transmit a request for location information and/or PSAP routing information to GMLC 111. Such a request may contain the cell identifier or other data that may be used by GMLC 111 and/or other systems or devices to determine location information and/or PSAP routing information. GMLC 111 may obtain location information and PSAP routing information and transmit such to network 101 and/or PSAP 110. This information may include the physical address and/or longitude and latitude of building 131, and may include routing information for PSAP 110. Upon receipt of this information, network 101 may then set up a call between wireless device 151 and PSAP 110, and may also transmit the location information received from GMLC 111 to PSAP 110. Thus, an accurate location for user 150 is provided to the appropriate emergency services and help may be quickly provided to user 150.

In providing telecommunications services to wireless device 151, data and voice communications, as well as any other form of communications, may be relayed between distributed node 130 and network 101 by central node 120. Thus all traffic between wireless device 151 and PSAP 110 may traverse network 101, central node 120, and distributed node 130. Alternatively, as will be discussed in more detail, other central nodes may be used to relay traffic from wireless device 151 to PSAP 110, from PSAP 110 to wireless device 151, or both.

Similarly, if user 160 is in building 141 and places an emergency call using wireless device 161, distributed node 140 may send a call request to central node 120, which may relay the call request and a cell identifier to network 101. Network 101 may obtain location information and PSAP routing data for distributed node 140 from GMLC 111, and use such information to set up a call between wireless device 161 and PSAP 110, and provide location information for building 141 to PSAP 110.

In one embodiment, alternate nodes may be configured on campus 102 to provide redundancy or duplicate connectivity means. For example, in the event of a major event, such as an explosion or release of poisonous materials, many calls may be initiated that connect through the distributed nodes of campus 102. In such an event, the volume of traffic generated by such calls and call requests may overwhelm central node 120. Alternatively, some event may render central node 120 inoperable. In either scenario, an alternate central node, such as alternate node 170 configured in building 171, may be configured to perform the duties of a central node. In one embodiment, alternate node 170 may not relay calls, call requests, or other traffic between distributed nodes and network 101 unless central node 120 is incapable of handling such traffic. In such an embodiment, alternate node 170 may serve as a back-up central node. In another embodiment, alternate node 170 may share traffic relay functions with central node 120 on a normal basis, and thus serve as a redundant central node. Any other configuration of nodes is contemplated as within the scope of the present disclosure.

In an embodiment with a configured alternate node 170, calls and other traffic may be relayed directly from distributed nodes, such as distributed node 140, to alternate node 170, which may relay such traffic to network 101, and also relay traffic from network 101 to distributed nodes so that the traffic reaches the end user devices. Alternatively, when multiple nodes serve as central nodes, traffic may be relayed from a distributed node, such as distributed node 140, to network 101 by central node 120, and relayed from network 101 to distributed node 140 by alternate node 170, or vice versa. Such asymmetric routing of traffic may be desired sue to bandwidth or equipment limitations or configurations, and all such routing and any variations thereof are contemplated as within the scope of the present disclosure.

In another embodiment, distributed nodes may also serve to relay traffic between other distributed nodes and one or more central nodes. For example, if central node 120 is rendered inoperable for any reason, distributed node 130 may be configured to determine that central node 120 is not available and, upon such a determination, may transmit traffic intended for network 101 to an intermediate node that may then relay the traffic to a central node. In one embodiment, distributed node 140 may serve as an intermediate node. Distributed node 140 may be configured to transmit such traffic to alternate node 170, which may relay the traffic to network 101. Distributed node 140 may be configured to determine whether central node 120 is available and may be configured to determine for itself which node is the appropriate recipient for such traffic. For example, if central node 120 is actually active, but the connection between distributed node 130 and central node 120 is unavailable, then distributed node 140 may pass the traffic from distributed node 130 to central node 120. Alternatively, if distributed node 140 determines that it cannot communication with central node 120, distributed node 140 may pass the traffic from distributed node 130 to alternate node 170.

In some embodiments, intermediate nodes may be configured to only provide traffic relay services between distributed nodes and central nodes, while in other embodiments central, distributed, or any other type of node may also provide intermediate node functions. In some embodiments, the functions that each node serves in any given configuration may be determined by the network and node resources that are available at a given time. In other embodiments, nodes may have static or fixed functions and may not be configured or capable of performing other functions. In still other embodiments, nodes may be configured to primarily perform certain functions and configured to perform other functions only in the event of a node failure or other node or network problem or unavailability, thus serving as backup nodes in the event that one or more nodes become inoperable. Any other configuration of nodes and any means of determining which nodes are suitable for relaying traffic are contemplated as within the scope of the present disclosure.

Figure 2:
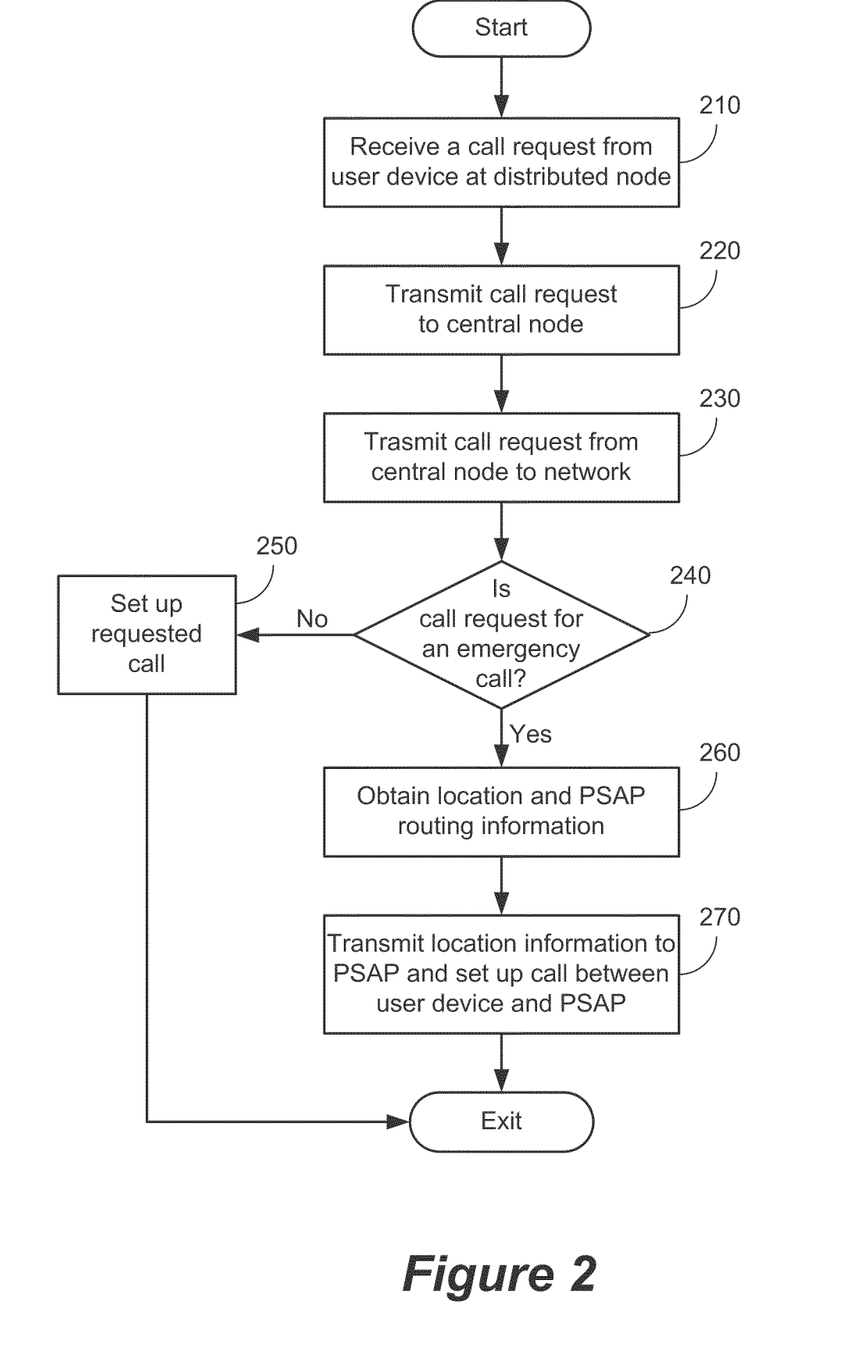
FIG. 2 illustrates a non-limiting, exemplary method of implementing emergency call services using distributed nodes.

FIG. 2 illustrates an exemplary non-limiting method of implementing the present subject matter. At block 210 a call request may be received at a distributed node. This may be any distributed node as described herein, such as distributed nodes 130 and 140, or a central node that may perform the functions of a distributed node, such as central node 120 or alternate node 170, or any other node, device, group of devices, or system that is configured to perform the functions of a distributed node. All such embodiments are contemplated.

At block 220, the call request may be transmitted to a central node. The call request may be altered or modified by the distributed node to include a cell identifier or other data that will indicate the identity and/or location of the distributed node. This may be any central node as described herein, such as central node 120 or alternate node 170, or any other node, device, group of devices, or system that is configured to perform the functions of a central node. Such a central node may also be configured to perform the functions of a distributed node and/or other functions. In one embodiment, the distributed node and the central node described in reference to FIG. 2 may be the same node. In other embodiments they are different nodes in the same physical location. In still other embodiments they are physically separate nodes. All such embodiments are contemplated.

At block 230, the central node may transmit the call request to a network. This may be any type of network as described herein, including a wireless network, and may be any other type of network capable of performing the communications functions described herein.

At block 240, a determination is made as to whether the call request is a request for an emergency call, such as a 911 call. This determination may be made on a network device of a wireless network as described herein. In other embodiment, the determination may be made on another device, such as a central node or a distributed node. In such embodiments, an indicator of the emergency status of the call request may be concatenated onto, supplement, or otherwise be included in the call request so that the indicator may be detected by the network receiving the call request. The determination of whether the call request is an emergency call request may be based on the recipient number (such as "911") or on any other characteristic, data, or identifier contained within the call request. All such embodiments are contemplated as within the scope of the present disclosure.

If it is determined that the call request is not an emergency call request, at block 250 the call request is processed as normal and the requested call is set up or otherwise handled and the method is complete.

If it is determined that the call request is an emergency call request, at block 260 location information and/or PSAP routing information is obtained. This be accomplished using any of the means disclosed herein, including transmitting a cell identifier or other identifying data to a GMLC, such as GMLC 111, and receiving a response providing the location information and/or the PSAP routing information. The same device may perform the determination of emergency status of a call request and determine the location and PSAP routing data in some embodiments, while in other embodiments these functions may be performed by two or more devices. All such embodiments are contemplated as within the scope of the present disclosure.

At block 270, location data may be transmitted to the appropriate PSAP, in one embodiment based on the obtained PSAP routing information. The requested call may also be set up between the appropriate PSAP and the user device that requested the emergency call. Any means and methods of providing location data to a PSAP and connecting a call between a PSAP and a user device are contemplated.

Figure 3:
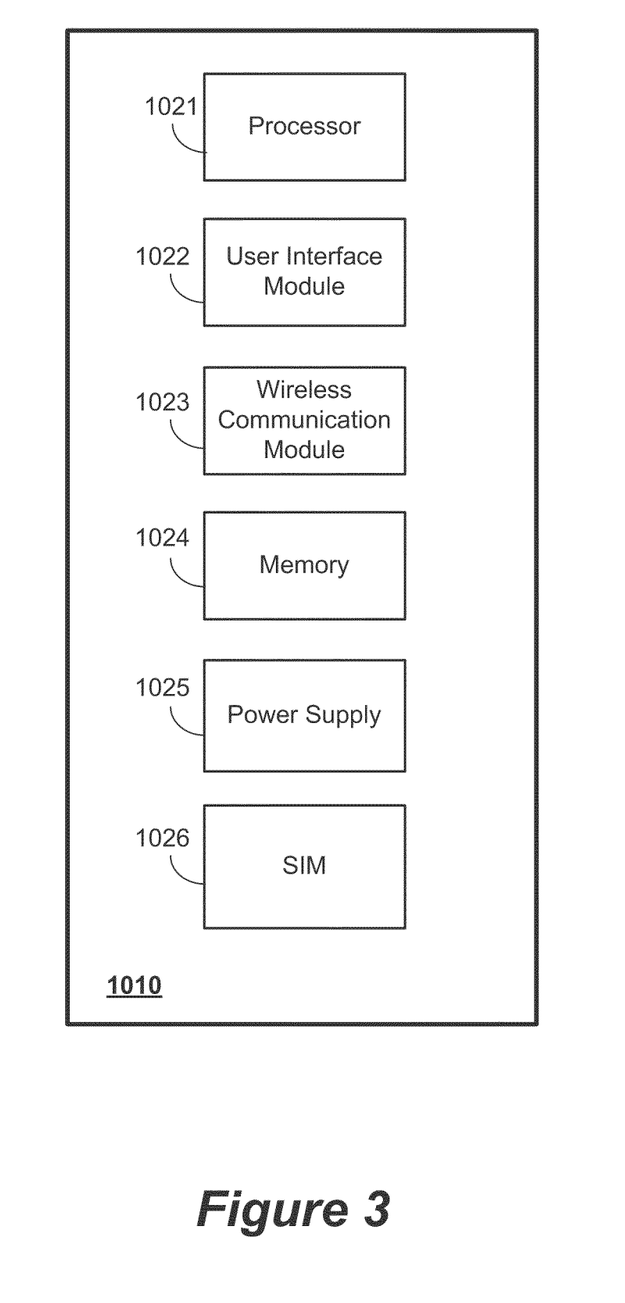
FIG. 3 is a block diagram of a non-limiting, exemplary wireless device that may be used in connection with an embodiment.

FIG. 3 illustrates an example wireless device 1010 that may be used in connection with an embodiment. References will also be made to other figures of the present disclosure as appropriate. For example, wireless devices 151 and 161 may each be a wireless device of the type described in regard to FIG. 3, and may have some, all, or none of the components and modules described in regard to FIG. 3. It will be appreciated that the components and modules of wireless device 1010 illustrated in FIG. 3 are illustrative, and that any number and type of components and/or modules may be present in wireless device 1010. In addition, the functions performed by any or all of the components and modules illustrated in FIG. 3 may be performed by any number of physical components. Thus, it is possible that in some embodiments the functionality of more than one component and/or module illustrated in FIG. 3 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to transmitting and receiving telephonic communications including emergency calls of any type, communicating with, operating, or interfacing with distributed and/or central nodes or running software configured to operate, communicate, or interface with distributed and/or central nodes, for example. User interface module 1022 may be any type or combination of hardware and/or software that enables a user to operate and interact with wireless device 1010, and, in one embodiment, to interact with a system or software enabling the user to place, request, and/or receive emergency calls, and/or a system or software enabling the user to view, modify, or delete related software objects. For example, user interface module 1022 may include a display, physical and/or "soft" keys, voice recognition software, microphone, speaker and the like. Wireless communication module 1023 may be any type or combination of hardware and/or software that enables wireless device 1010 to communicate with wireless network equipment, distributed nodes, and/or central nodes, for example, network 101, distributed node 130, distributed node 140, central node 120, alternate node 170, or any other type of wireless communications network or network equipment. Memory 1024 enables wireless device 1010 to store information, such as emergency call numbers and preferences. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 4:
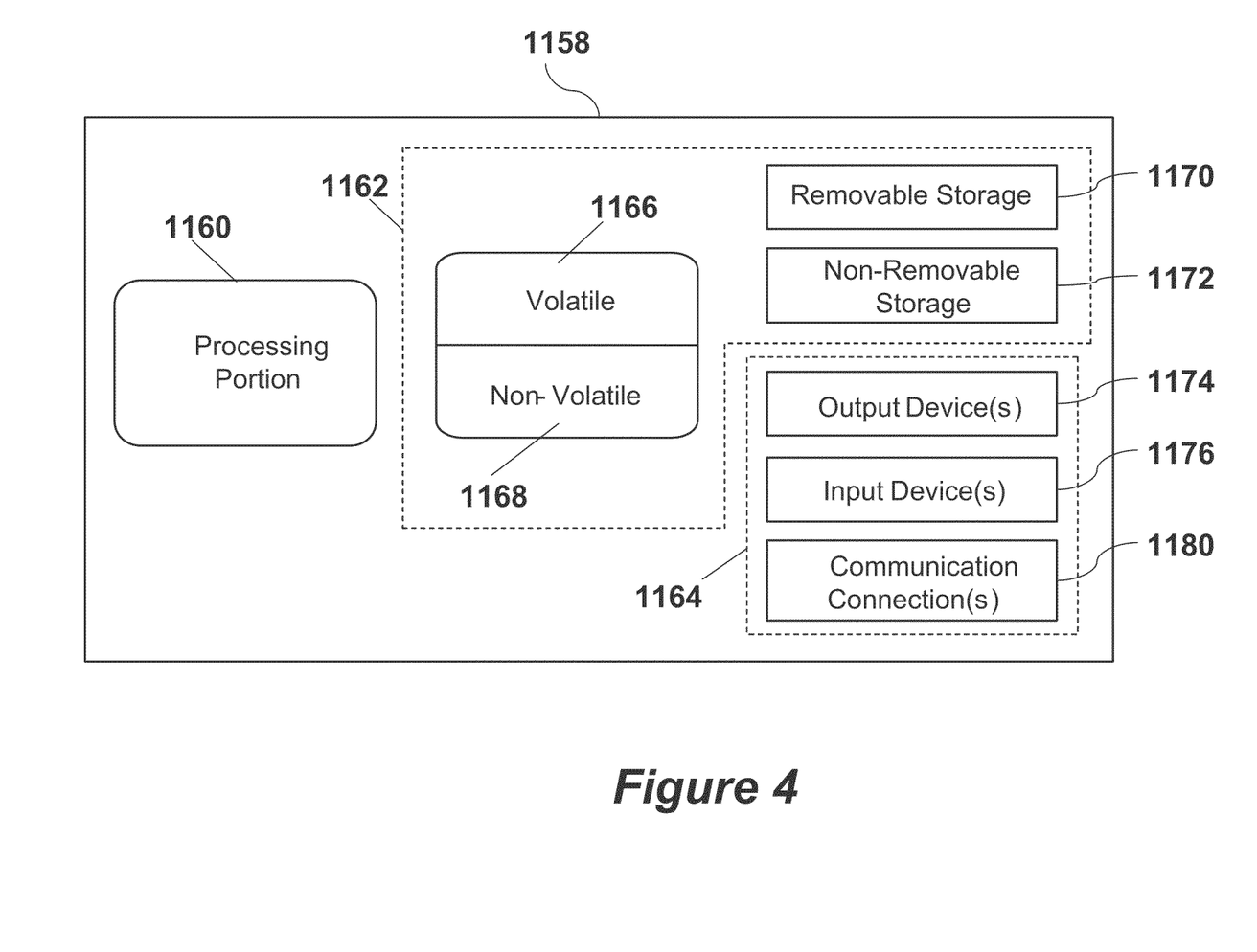
FIG. 4 is a block diagram of a non-limiting, exemplary processor in which the present subject matter may be implemented.

FIG. 4 is a block diagram of an example processor 1158 which may be employed in any of the embodiments described herein, including as one or more components of wireless devices 151 and 161, as one or more components of network equipment, node equipment, or related equipment, such as any component shown in FIG. 1, and/or as one or more components of any third party system or subsystem that may implement any portion of the subject matter described herein. It is emphasized that the block diagram depicted in FIG. 4 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof The processor 1158 comprises a processing portion 1160, a memory portion 1162, and an input/output portion 1164. The processing portion 1160, memory portion 1162, and input/output portion 1164 are coupled together (coupling not shown in FIG. 4) to allow communications between these portions. The input/output portion 1164 is capable of providing and/or receiving components, commands, and/or instructions, utilized to, for example, place, receive, or set up emergency call, determine location information and/or PSAP routing information, or perform any other function described herein.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing emergency calls, other telephonic communications, etc. For example, the memory portion is capable of storing call preferences and/or software capable of processing call requests, receiving calls, etc. Depending upon the exact configuration and type of processor, the memory portion 1162 can be volatile (such as RAM) 1166, non-volatile (such as ROM, flash memory, etc.) 1168, or a combination thereof The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through node and network equipment as illustrated in FIG. 1. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

The network and nodes illustrated in FIGS. 1 may comprise any appropriate telephony radio network, or any other type of communications network, wireline or wireless, or any combination thereof The following description sets forth some exemplary telephony radio networks, such as the global system for mobile communications (GSM), and non-limiting operating environments. The below-described operating environments should be considered non-exhaustive, however, and thus the below-described network architectures merely show how emergency call processing may be implemented with stationary and non-stationary network structures and architectures in order to provide emergency call services using distributed nodes. It can be appreciated, however, that methods and systems for providing emergency call services using distributed nodes such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1× Evolution Data Optimized (EVDO), Code Division Multiple Access-2000 (cdma2000 3×), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for providing emergency call services using distributed nodes can be applied independently of the method of data transport, and do not depend on any particular network architecture, or underlying protocols.

Figure 5:
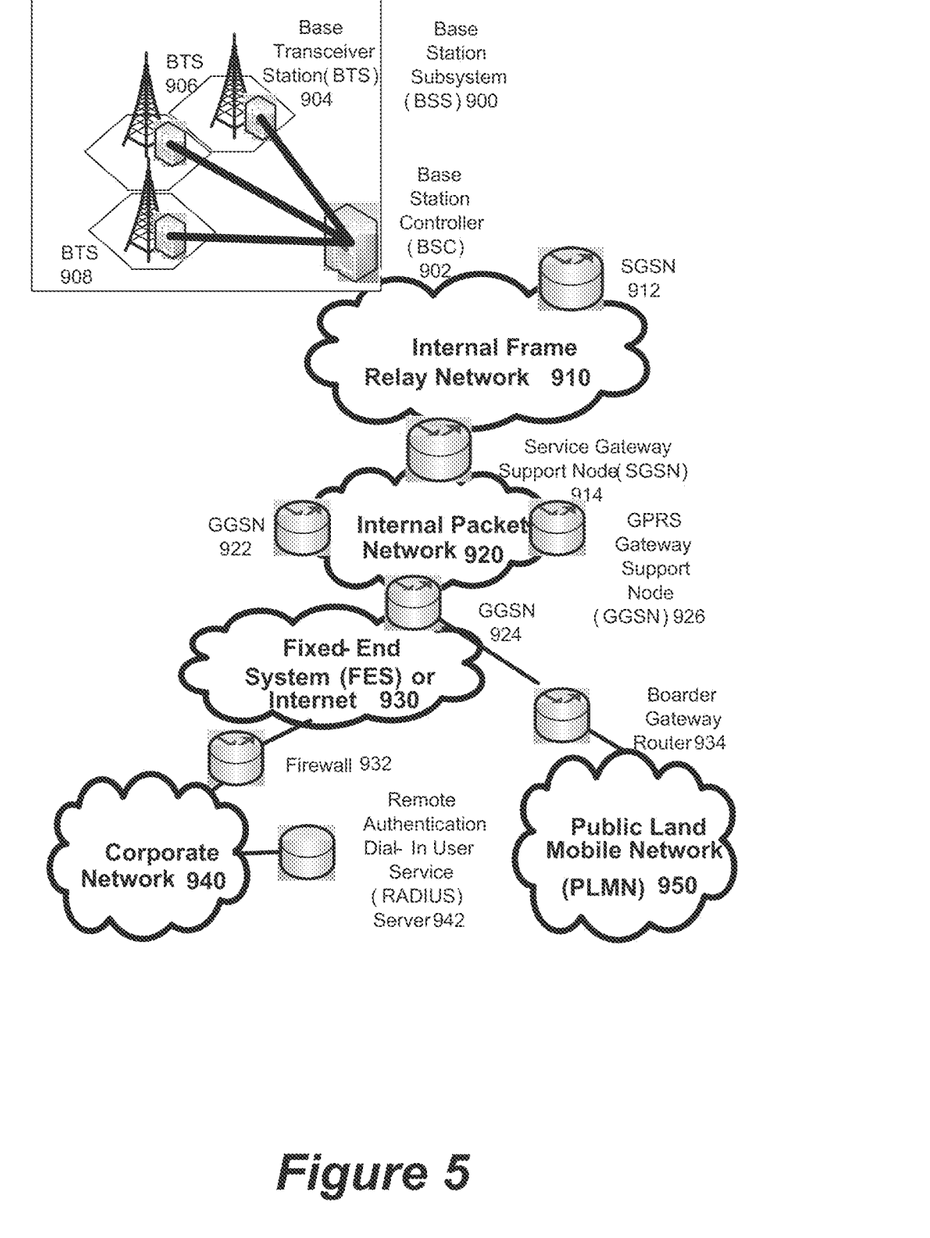
FIG. 5 is an overall block diagram of an exemplary packet-based mobile cellular network environment, such as a GPRS network, in which the present subject matter may be implemented.

FIG. 5 depicts an overall block diagram of an exemplary packet-based mobile cellular network environment, such as a GPRS network, in which the systems and methods for providing emergency call services using distributed nodes such as those described herein can be practiced. In an example configuration, network 101 as illustrated in FIG. 1 may be encompassed by or interact with the network environment depicted in FIG. 5. Similarly, central node 120 and alternate node 170 may communicate or interact with a network environment such as that depicted in FIG. 5. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 151 and 161) become connected to the wireless network. In exemplary fashion, the packet traffic originating from user devices (e.g., wireless devices 151 and 161) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 6:
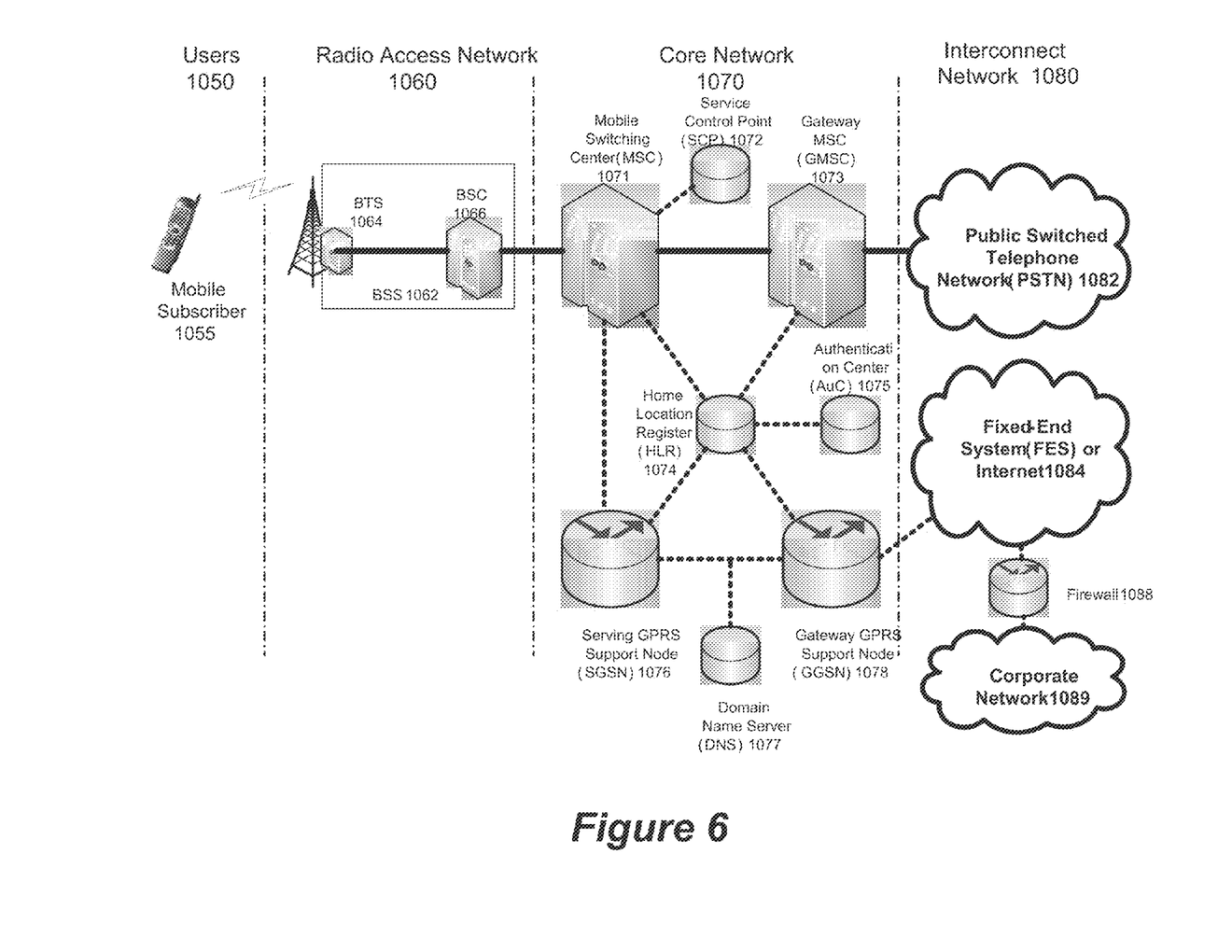
FIG. 6 illustrates a non-limiting, exemplary architecture of a typical GPRS network as segmented into four groups.

FIG. 6 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 6). In an example embodiment, the device depicted as mobile subscriber 1055 may comprise wireless devices 151 and 161. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 6, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless device 151 or 161, used by an end user of a mobile cellular service or a wireless provider. When a mobile subscriber turns on his or her mobile device, the mobile device may go through an attach process by which the mobile device attaches to an SGSN of the GPRS network. In FIG. 6, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of providing emergency call services using distributed nodes such as those described herein can include but are not limited to Gateway GPRS Support Node tables, Fixed End System router tables, firewall systems, VPN tunnels, and any number of other network elements as required by the particular digital network.

Figure 7:
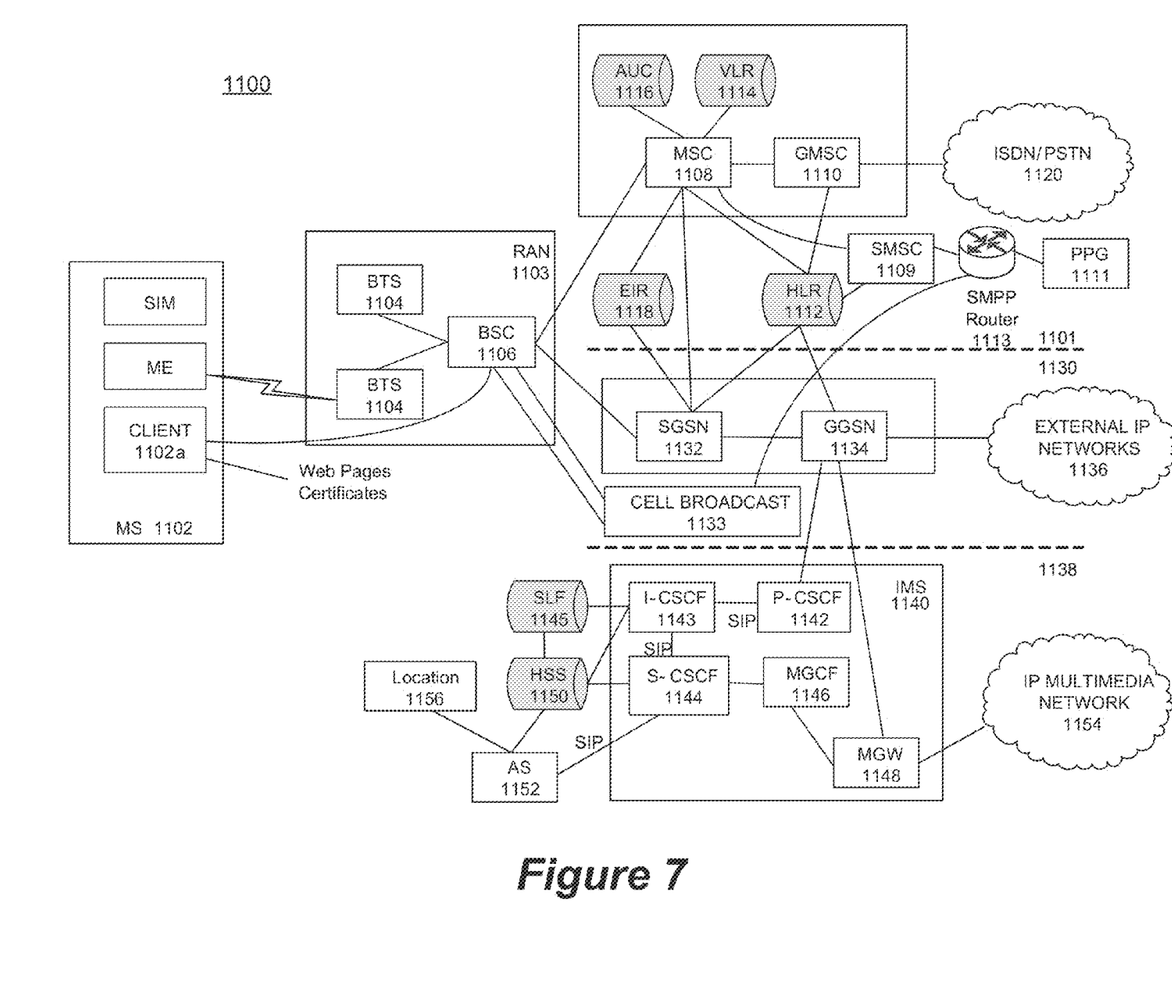
FIG. 7 illustrates a non-limiting alternate block diagram of an exemplary GSM/GPRS/IP multimedia network architecture in which the present subject matter may be implemented.

FIG. 7 illustrates another exemplary block diagram view of a GSM/GPRS/IP multimedia network architecture 1100 in which the systems and methods for providing emergency call services using distributed nodes such as those described herein can be incorporated. As illustrated, architecture 1100 of FIG. 7 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 151 and 161) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for providing emergency call services using distributed nodes such as those described herein have been described in connection with various communications devices and computing devices/processors, the underlying concepts can be applied to any communications or computing device, processor, or system capable of implementing the distributed node systems and methods described. The various techniques described herein can be implemented in connection with hardware or software or, where appropriate, with a combination of both. Thus, the methods and apparatuses for providing emergency call services using distributed nodes, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for providing emergency call services. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for providing emergency call services using distributed nodes as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing emergency call services using distributed nodes. When implemented on a general-purpose processor, the program code combines with the processor to provide a unique apparatus that operates to invoke the functionality of a distributed node and/or emergency call system. Additionally, any storage techniques used in connection with a distributed node system can invariably be a combination of hardware and software.

While emergency call services using distributed nodes has been described in connection with the various embodiments of the various figures, it is to be understood that other similar embodiments can be used or modifications and additions can be made to the described embodiment for performing the same function of providing emergency call services using distributed nodes without deviating therefrom. For example, one skilled in the art will recognize that providing emergency call services using distributed nodes as described in the present application may apply to any environment, whether wired or wireless, and may be applied to any number of such devices connected via a communications network and interacting across the network. Therefore, providing emergency call services using distributed nodes should not be limited to any single embodiment, but rather should be construed in breadth and scope in accordance with the appended claims.

What is claimed is:

1. A wireless network device comprising:
   a memory comprising instructions; and
   a processor coupled to the memory, wherein, when executing the instructions, the processor effectuates operations comprising:
   receiving a call request through a wireless network indicative of the call request being received from a user wireless device at a distributed node, transmitted from the distributed node to a wireless network base station, and transmitted from the wireless network base station to the wireless network device, wherein the distributed node is not configured to communicate directly with the wireless network and is configured to communicate directly with the wireless network base station and otherwise isolated from the wireless network in which the wireless network device is configured, and wherein the call request comprises an identifier that uniquely identifies the distributed node;

determining that the call request is an emergency call request;

transmitting a request for location information for the distributed node to a location services device comprising a database providing location information and cell identifiers for each distributed node, wherein the request for location information for the distributed node comprises the identifier of the distributed node;

receiving the location information from the database for the distributed node;

transmitting the location information for the distributed node to an emergency services provider;

obtaining emergency services provider routing information by transmitting the identifier of the distributed node to the location services device and receiving the emergency services provider routing information from the location services device; and initiating a call based on the call request.

2. The wireless network device of claim 1, wherein the call request is further indicative of the identifier of the distributed node being transmitted from the distributed node to the wireless network base station, and being transmitted from the wireless network base station to the wireless network device.

3. The wireless network device of claim 1, wherein the identifier of the distributed node is a cell global identity.

4. The wireless network device of claim 1, wherein the operation of determining that the call request is the emergency call request comprises determining that the call request is the emergency call request based on a destination number of the call request.

5. A method comprising:

receiving, through a network, on a wireless network device, a call request indicative of being received from a user wireless device at a distributed node, transmitted from the distributed node to a wireless network base station, and transmitted from the wireless network base station to the wireless network device, wherein the distributed node is not configured to communicate directly with the network and is communicatively connected to the wireless network base station and otherwise isolated from a wireless network in which the wireless network device is configured, and wherein the call request comprises an identifier that uniquely identifies the distributed node;

determining, on the wireless network device, that the call request is an emergency call request;

transmitting, from the wireless network device to a location services device comprising a database providing location information and cell identifiers for each distributed node, a request for location information for the distributed node, wherein the request for location information for the distributed node comprises the identifier of the distributed node;

receiving, from the database on the wireless network device, the location information for the distributed node;

transmitting, from the wireless network device, the location information for the distributed node to an emergency services provider;

obtaining emergency services provider routing information by transmitting the identifier of the distributed node to the location services device and receiving the emergency services provider routing information from the location services device and initiating a call, on the wireless network device, based on the call request.

6. The method of claim 5, wherein the call request is further indicative of the identifier of the distributed node being transmitted from the distributed node to the wireless network base station, and being transmitted from the wireless network base station to the wireless network device.

7. The method of claim 5, wherein transmitting the request for location information for the distributed node comprises transmitting the identifier of the distributed node to a location services device.

8. The method of claim 5, wherein the identifier of the distributed node is a cell global identity.

9. The method of claim 5, wherein determining that the call request is the emergency call request comprises determining that the call request is the emergency call request based on a destination number of the call request.

10. A non-propagating computer-readable storage medium having stored thereon computer-executable instructions that, when executed by a processor, effectuate operations comprising:

receiving a call request through a wireless network indicative of being received from a user wireless device at a distributed node, transmitted from the distributed node to a —wireless network base station, and transmitted from the wireless network base station to a wireless network device, wherein the distributed node is not configured to communicate directly with the wireless network and is configured to communicate directly with the wireless network base station and otherwise isolated from the wireless network in which the wireless network device is configured, and wherein the call request comprises an identifier that uniquely identifies the distributed node;

determining that the call request is an emergency call request;

transmitting a request for location information for the distributed node from a location services device comprising a database providing location information and cell identifiers for each distributed node, wherein the request for location information for the distributed node comprises the identifier of the distributed node;

receiving the location information for the distributed node from the database;

transmitting the location information for the distributed node to an emergency services provider;

obtaining emergency services provider routing information by transmitting the identifier of the distributed node to the location services device and receiving the emergency services provider routing information from the location services device; and initiating a call based on the call request.

11. The non-propagating computer-readable storage medium of claim 10, wherein the call request is further indicative of the identifier of the distributed node being transmitted from the distributed node to the wireless network base station, and being transmitted from the wireless network base station to the wireless network device.

12. The non-propagating computer-readable storage medium of claim 10, wherein the operation of transmitting the request for location information for the distributed node comprises transmitting the identifier of the distributed node to a location services device.

13. The non-propagating computer-readable storage medium of claim 10, wherein operation of determining that the call request is the emergency call request comprises determining that the call request is the emergency call request based on a destination number of the call.

* * * * *